United States Patent
Forgrieve et al.

(10) Patent No.: US 7,489,268 B2
(45) Date of Patent: Feb. 10, 2009

(54) METHODS AND SYSTEMS FOR PRODUCING AN INTERPRETIVE AIRBORNE RADAR MAP

(75) Inventors: Andrew Forgrieve, Woodinville, WA (US); Tim B. Freedman, Everett, WA (US); John M. Noll, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 69 days.

(21) Appl. No.: 11/620,975

(22) Filed: Jan. 8, 2007

(65) Prior Publication Data

US 2008/0316089 A1    Dec. 25, 2008

(51) Int. Cl.
*G01S 13/89* (2006.01)
*G01S 13/93* (2006.01)
*G01S 13/04* (2006.01)
*G01S 13/00* (2006.01)

(52) U.S. Cl. .................. 342/191; 342/27; 342/29; 342/175; 342/190; 342/195; 701/1; 701/3; 701/14; 701/300; 701/301

(58) Field of Classification Search ............. 342/27–29, 342/33, 36, 37, 41, 55, 61–65, 175–176, 342/179, 195, 25 R–25 F, 357.01–357.17, 342/74, 89, 90, 165, 173, 174, 70–72; 701/1, 701/3, 14, 300, 301, 200, 207, 213–216
See application file for complete search history.

(56) References Cited

U.S. PATENT DOCUMENTS

| | | | | |
|---|---|---|---|---|
| 2,940,072 | A * | 6/1960 | Florsheim | 342/175 |
| 3,153,230 | A * | 10/1964 | Krevelen et al. | 342/65 |
| 3,206,745 | A * | 9/1965 | Waters | 342/65 |
| 4,764,873 | A * | 8/1988 | Libby | 701/301 |
| 5,260,708 | A * | 11/1993 | Auterman | 342/25 C |
| 5,349,533 | A * | 9/1994 | Libby | 701/301 |
| 5,408,414 | A * | 4/1995 | Nomoto et al. | 701/301 |
| 5,552,787 | A * | 9/1996 | Schuler et al. | 342/25 A |
| 5,680,138 | A * | 10/1997 | Pritt | 342/179 |
| 5,936,552 | A | 8/1999 | Wichgers et al. | |

(Continued)

FOREIGN PATENT DOCUMENTS

GB      959562      6/1964

(Continued)

*Primary Examiner*—Bernarr E Gregory
(74) *Attorney, Agent, or Firm*—Black Lowe & Graham

(57) ABSTRACT

Systems and methods for identifying and uniquely displaying ground features (terrain/obstacles) that are shadowed from an aircrafts radar system. An example system includes one or more aircraft information, sources, a database that stores three-dimensional terrain/obstacle data, a display device, and a processor in data communication with the one or more aircraft information sources and the database. The processor receives aircraft position, heading and altitude information from the one or more aircraft information sources. The processor projects a vector in a three-dimensional digital space onto the three-dimensional terrain/obstacle data stored in the database based on the received aircraft position, heading and altitude information to determine if the projected vector intersects more than one terrain feature. If the feature is intersected by the vector and the feature is further away from the aircraft than another feature that is also intersected by the vector, it is uniquely displayed on the display device.

11 Claims, 3 Drawing Sheets

U.S. PATENT DOCUMENTS

| | | | |
|---|---|---|---|
| 6,011,505 A * | 1/2000 | Poehler et al. | 342/25 C |
| 6,021,374 A * | 2/2000 | Wood | 701/301 |
| 6,076,042 A * | 6/2000 | Tognazzini | 701/301 |
| 6,101,431 A * | 8/2000 | Niwa et al. | 701/14 |
| 6,233,522 B1 | 5/2001 | Morici | |
| 6,236,351 B1 * | 5/2001 | Conner et al. | 342/74 |
| 6,708,091 B2 * | 3/2004 | Tsao | 701/301 |
| 6,738,011 B1 * | 5/2004 | Evans | 342/179 |
| 6,741,202 B1 * | 5/2004 | Krikorian et al. | 342/25 C |
| 6,756,934 B1 * | 6/2004 | Chen et al. | 342/175 |
| 6,885,334 B1 * | 4/2005 | Hager et al. | 342/62 |
| 7,046,824 B2 * | 5/2006 | Yamamoto et al. | 701/3 |
| 7,203,489 B2 * | 4/2007 | Saunders | 342/173 |
| 7,205,927 B2 * | 4/2007 | Krikorian et al. | 342/179 |
| 7,221,307 B1 * | 5/2007 | Friesel | 342/90 |
| 7,280,897 B2 * | 10/2007 | Allstadt et al. | 701/300 |
| 2004/0068372 A1 * | 4/2004 | Ybarra et al. | 701/301 |
| 2006/0273946 A1 * | 12/2006 | Krikorian et al. | 342/179 |

FOREIGN PATENT DOCUMENTS

| | | | | |
|---|---|---|---|---|
| JP | 61-59276 A | * | 3/1986 | 342/179 |
| JP | 61-147172 A | * | 7/1986 | 342/37 |
| JP | 3-94186 A | * | 4/1991 | 342/55 |
| JP | 3-160385 A | * | 7/1991 | 342/41 |

* cited by examiner

METHODS AND SYSTEMS FOR PRODUCING AN INTERPRETIVE AIRBORNE RADAR MAP

BACKGROUND OF THE INVENTION

Present airborne radar systems produce valuable information to flight crews. When radar mapping the earth, the flight crew can clearly see all terrain and man-made obstacles that the radar system paints. However, radars are limited by line of sight and, therefore, produce no information of regions that are shadowed by terrain or other features.

Therefore, there exists a need for improving the information presented on a radar display.

SUMMARY OF THE INVENTION

The present invention provides systems and methods for identifying and uniquely displaying ground features (terrain/obstacles) that are shadowed from an aircrafts radar system.

An example system includes one or more aircraft information sources, a database that stores three-dimensional terrain/obstacle data, a display device, and a processor in data communication with the one or more aircraft information sources and the database. The processor receives aircraft position, heading and altitude information from the one or more aircraft information sources. The processor projects a vector in a three-dimensional digital space onto the three-dimensional terrain/obstacle data stored in the database based on the received aircraft position, heading and altitude information to determine if the projected vector intersects more than one terrain feature. A feature is indicated as being shadowed if the feature is intersected by the vector and the feature is further away from the aircraft than another feature that is also intersected by the vector. Shadowed features are then uniquely displayed on the display device. The processor repeats this analysis for subsequent vectors.

In one aspect of the invention, the display device simultaneously displays a radar image and the uniquely displayed indicated features.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
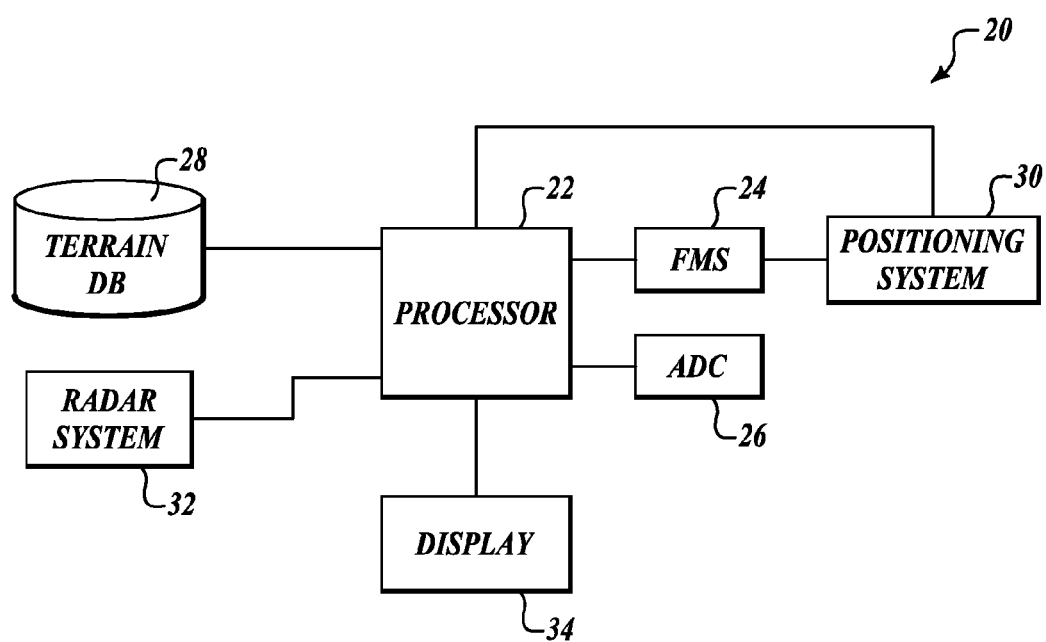
FIG. 1 illustrates a schematic diagram of an example system formed in accordance with an embodiment of the present invention.

FIG. 1 illustrates a block diagram of an example system 20 for improving the information displayed of a radar display image. The example system 20 includes a processor 22, a terrain/obstacle three-dimensional database 28, a radar system 32, a display 34, and one or more aircraft information sources, such as an air data computer (ADC) 26, a flight management system (FMS) 24 or a positioning system 30, such as a Global Positioning System (GPS).

The processor 22 is in data communication with the terrain database 28, the radar system 32, the display 34 and the aircraft information sources. The processor 22 receives aircraft information, such as position, heading, and altitude from one or more of the FMS 24, ADC 26, or positioning system 30. Using the received aircraft information, the processor 22 determines if any terrain data from the terrain database 28 is shadowed by other terrain data based on a vector projected from the aircraft's position to the terrain of the database 28 based on the received aircraft information. The processor 22 then produces a radar image for display on the display 34. The radar image includes radar information received from the radar system 32 that is enhanced with image features that identify areas of terrain that are in a radar shadow as determined by the processor 22.

Figure 2:
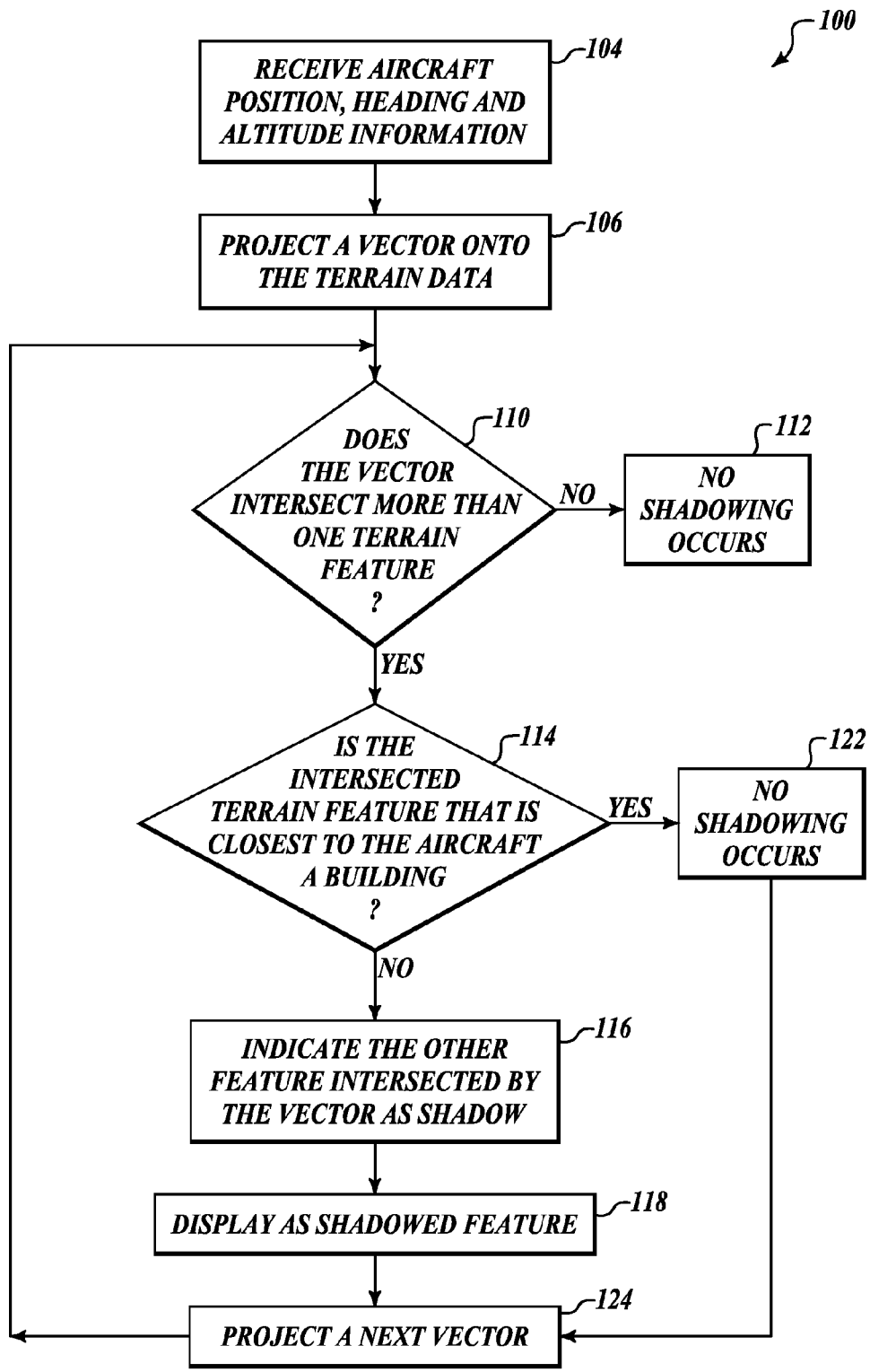
FIG. 2 illustrates a flow diagram performed by one or more components of the system shown in FIG. 1.

FIG. 2 illustrates a flow diagram of an example process 100 as performed by the processor 22 of FIG. 1. First at a block 104, the processor 22 receives aircraft position, heading and altitude information from one or more of the aircraft information sources. Next at a block 106, a vector is projected (i.e., virtually/mathematically) in a digital/virtual three-dimensional (3D) environment from the received aircraft position, heading and altitude to the 3D terrain data that is stored in the terrain database 28. The vector simulates a radar signal produced by the radar system 32. At a decision block 110, the example process 100 determines if the vector intersects more than one feature of the terrain database. If the vector intersects only one terrain feature, then shadowing is determined not to occur, see block 112. If the vector does intersect more than one terrain feature, then the example process 100 goes to decision block 114 which determines if the intersected terrain feature that is closest to the aircraft is a building or some other manmade structure. If the closest intersected terrain feature is not a building, then the other terrain feature(s) that is intersected by the vector is indicated as being in the radar shadow of the closest intersected terrain feature, see block 116. The feature that is indicated as shadowed is then displayed on the radar display 34 in a unique manner along with a radar image, see block 118. If at the decision block 114 the closest intersected terrain feature is a building, then no shadowing of subsequent intersected terrain features is indicated, see block 122. After the steps performed in block 122 and 118, the example process 100 projects a next vector at a block 124 and returns to the decision block 110. The example process 100 is repeated as long as the radar system is activated, or the terrain shadowing feature is activated, or as desired by the flight crew or system designer. Projection of vectors and analysis may be performed.

Figure 3:
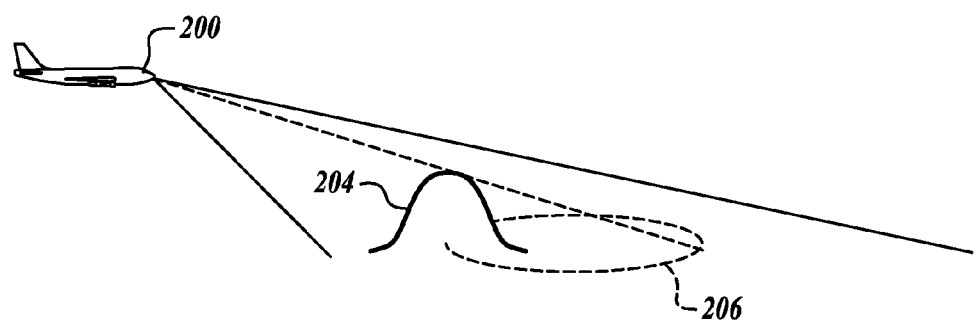
FIG. 3 illustrates a side view of an aircraft radar mapping a section of terrain.

FIG. 3 illustrates a side view of a graphical illustration of terrain that would actually be identified as shadowed in a terrain shadowing situation. In this example, an aircraft 200 is flying over terrain that includes a mountain 204. Behind the mountain 204 is an area of terrain 206 that a radar system of the aircraft 200 is not able to paint. Therefore, in this example the processor 22 uniquely identifies the terrain area 206 as shadowed terrain and displays this area of terrain 206 with the corresponding radar image. Indicating the area of terrain as shadowed may also be included in other ground type displays.

Figure 4:
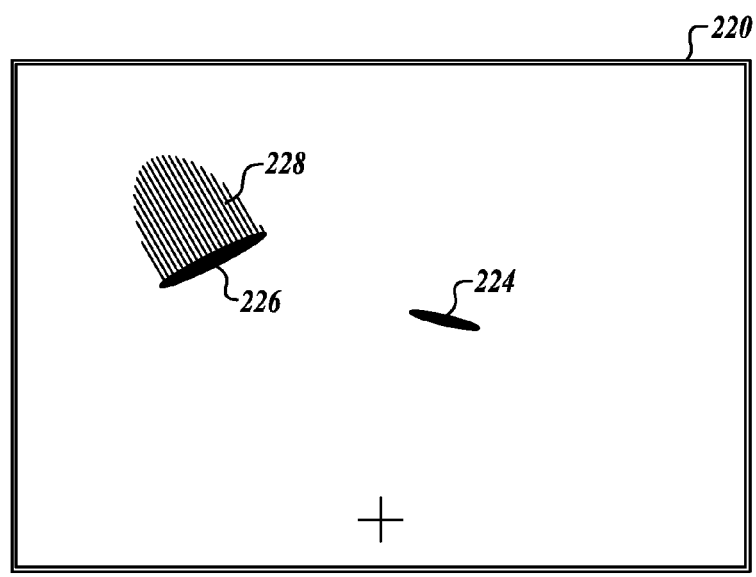
FIG. 4 illustrates an example screen shot of a radar map display formed in accordance with an embodiment of the present invention.

FIG. 4 illustrates an example of a radar image 220 that is performed in accordance with the process 100 of FIG. 2 as performed by the system 20 of FIG. 1. The radar image 220 includes radar return features 224 and 226 that are produced by the radar system 32. In this example, the radar feature 224 is identified in the terrain database 28 as buildings or a city. In this embodiment, terrain behind the feature 224 is not identified as shadowed. However, in other embodiments the terrain behind manmade obstacles or buildings may be identified as shadowed and, thus, displayed as such. The feature 226 is identified as terrain. The area 228 located behind the terrain 226 is identified as shadowed by the feature 226 and, thus, is indicated differently on the display 220. The air crew can easily distinguish between terrain that is visible to the radar (226) and terrain this is not visible (228).

While the preferred embodiment of the invention has been illustrated and described, as noted above, many changes can be made without departing from the spirit and scope of the invention. For example, the processor 22 may identify terrain or obstacles as shadowed if they are determined to be located behind an obstacle and thus uniquely present it on the display 34. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   a. receiving aircraft position, heading and altitude information;
   b. projecting a vector in a three-dimensional digital space onto stored three-dimensional terrain/obstacle data based on the received aircraft position, heading and altitude information;
   c. determining if the projected vector intersects more than one terrain feature; and
   d. indicating a feature is shadowed if the feature is intersected by the vector and the feature is further away from the aircraft than another feature that is also intersected by the vector.

2. The method of claim 1, further comprising uniquely displaying the indicated feature.

3. The method of claim 2, further comprising repeating a-d for subsequent vectors.

4. The method of claim 3, further comprising simultaneously displaying a radar image and the uniquely displayed indicated features.

5. The method of claim 1, wherein the feature intersected by the vector that is closest to the aircraft consists of a terrain feature.

6. The method of claim 1, wherein the aircraft position, heading and altitude information are received from one or more of a Global Positioning System, a Flight Management System, or an Air Data Computer.

7. A system comprising:
   one or more aircraft information sources;
   a database configured to store three-dimensional terrain/obstacle data;
   a display device; and
   a processor in data communication with the one or more aircraft information sources, the display device and the database, the processor comprising:
      a component configured to receive aircraft position, heading and altitude information from the one or more aircraft information sources;
      a component configured to project a vector in a three-dimensional digital space onto the three-dimensional terrain/obstacle data stored in the database based on the received aircraft position, heading and altitude information;
      a component configured to determine if the projected vector intersects more than one terrain feature; and
      a component configured to indicate a feature is shadowed if the feature is intersected by the vector and the feature is further away from the aircraft than another feature that is also intersected by the vector,
   wherein the display device uniquely displays the indicated feature.

8. The system of claim 7, wherein the processor repeats for subsequent vectors.

9. The system of claim 8, wherein the display device simultaneously displays a radar image and the uniquely displayed indicated features.

10. The system of claim 7, wherein the feature intersected by the vector that is closest to the aircraft consists of a terrain feature.

11. The system of claim 7, wherein the one or more aircraft information sources include at least one of a Global Positioning System, a Flight Management System, or an Air Data Computer.

* * * * *